(12) United States Patent
Hsu et al.

(10) Patent No.: US 11,137,012 B2
(45) Date of Patent: Oct. 5, 2021

(54) WOOD SCREW

(71) Applicants: Kuo Tai Hsu, Tainan (TW); Ming Hao Hsu, Tainan (TW)

(72) Inventors: Kuo Tai Hsu, Tainan (TW); Ming Hao Hsu, Tainan (TW)

( * ) Notice: Subject to any disclaimer, the term of this patent is extended or adjusted under 35 U.S.C. 154(b) by 185 days.

(21) Appl. No.: 16/281,310

(22) Filed: Feb. 21, 2019

(65) Prior Publication Data
US 2020/0271151 A1    Aug. 27, 2020

(51) Int. Cl.
*F16B 25/00*    (2006.01)

(52) U.S. Cl.
CPC ...... *F16B 25/0068* (2013.01); *F16B 25/0015* (2013.01); *F16B 25/0057* (2013.01); *F16B 25/00* (2013.01)

(58) Field of Classification Search
CPC .. F16B 25/00; F16B 25/0015; F16B 25/0057; F16B 25/0068; F16B 25/0078; F16B 25/0084; F16B 33/02; F16B 35/041; F16B 35/065
USPC ....... 411/387.1, 387.3, 387.5, 411–412, 424, 411/426
See application file for complete search history.

(56) References Cited

U.S. PATENT DOCUMENTS

| | | | | |
|---|---|---|---|---|
| 3,045,523 A * | 7/1962 | Reed | ............ | F16B 25/0015 411/387.1 |
| 5,827,030 A * | 10/1998 | Dicke | ............ | F16B 25/0015 411/387.4 |
| 6,086,303 A * | 7/2000 | Fluckiger | ............ | F16B 5/0275 411/399 |
| 6,328,516 B1 * | 12/2001 | Hettich | ............ | F16B 25/0015 411/311 |
| 7,950,888 B2 * | 5/2011 | Dohi | ............ | F16B 25/0047 411/412 |
| 8,419,332 B2 * | 4/2013 | Kochheiser | ............ | F16B 25/0031 411/412 |
| 8,480,342 B2 * | 7/2013 | Stiebitz | ............ | F16B 25/106 411/386 |
| 9,850,935 B2 * | 12/2017 | Shih | ............ | F16B 25/0084 |
| 9,957,994 B2 * | 5/2018 | Hsu | ............ | F16B 25/103 |
| 2013/0039720 A1 * | 2/2013 | Shih | ............ | F16B 25/0015 411/387.4 |

(Continued)

FOREIGN PATENT DOCUMENTS

| | | |
|---|---|---|
| EP | 1411252 A2 | 4/2004 |
| TW | 201544718 A | 12/2015 |

*Primary Examiner* — Roberta S Delisle
(74) *Attorney, Agent, or Firm* — Rosenberg, Klein & Lee

(57) ABSTRACT

A wood screw that includes a head and a shank is revealed. The shank is formed by a main shank portion and a tapered portion whose diameter is smaller than that of the main shank portion, both provided with a locking thread. A plurality of drilling units, whose outside diameter of the drilling unit is smaller than that of the locking thread, is disposed on the tapered portion. The drilling units first destroy workpiece material corresponding to the main shank portion so that the workpiece material becomes loose and the resistance of the locking thread of the main shank portion is reduced. Thereby the wood screw is screwed into the workpiece more smoothly. Moreover, an internal thread segment whose thread depth matches that of the locking thread of the main shank portion is formed so that the wood screw and the workpiece are fastened more firmly.

6 Claims, 10 Drawing Sheets

(56) References Cited

U.S. PATENT DOCUMENTS

2017/0108026 A1\* 4/2017 Yang .................. F16B 25/0078
2017/0241463 A1 8/2017 Shih \* cited by examiner

WOOD SCREW

BACKGROUND OF THE INVENTION

Field of the Invention

The present invention relates to a wood screw, especially to a wood screw that is able to be driven into workpieces more smoothly and firmly.

Description of Related Art

Refer to US Pat. App. No. 2017/0241463A1 "HOLE EXPANDING SCREW", US Pat. App. No. 2013/0039720A1 "SCREW", European Pat. No. 1411252A2 "Screw to be used with building elements made of wood", and Taiwanese Pat. Pub, No. TW201544718A, the respective screw revealed in these prior arts mainly includes a screw head and a screw shank connected to the screw head. A cone is formed on a rear end of the screw shank and the screw shank has the same diameter from one end with the cone to the other end connected to the head. A thread is running helically from the cone along the length direction of the screw shank. A plurality of drilling units is arranged at the screw shank along the length direction linearly or obliquely and each drilling unit would extend across/or not extend across one pitch of the thread.

Refer to US Pat. App. No. 2017/0241463A1, the screw includes a plurality of hole expanding blocks (with the reference number 221 in FIG. 2B) linearly arranged at a screw shank having the same diameter. The respective hole expanding block doesn't span one pitch of a thread of the screw. Refer to US Pat. App. No. 2013/0039720A1, a plurality of spiral cutting edges (with the reference number 331 in FIG. 1) is obliquely disposed on a rod (shank) having the same diameter of a screw. Each spiral cutting edge 331 extends across at least one pitch of a thread of the screw. Refer to European Pat. No. 1411252A2, a shaft of a screw is provided with a plurality of ribs (with the reference number 3 in FIG. 1) arranged linearly. The rib spans at least one pitch of a thread of the screw with the same diameter. Refer to Taiwanese Pat. Pub. No. 201544718A, a wood screw is revealed. A cylindrical screw rod having the same diameter is provided with a plurality of elevations (with the reference number 4 in FIG. 1 and FIG. 4) arranged linearly thereof. The elevation (4 in FIG. 1) extends across at least one pitch of a thread of the screw while another type of elevation (4 in FIG. 4) doesn't span one pitch of the thread of the screw. Thereby the cone of the screw shank/rod is abutting against the workpiece such as wood and a force is applied to rotate the screw for driving the cone into the workpiece when the screw is driven into the workpiece. Then the screw thread is engaged into the hole formed in the workpiece by drilling of the drilling units so as to form an internal thread section.

However, the drilling unit has an outside diameter larger than the core diameter of the thread in order to reduce driving torque. Thus the inside diameter of the threaded hole formed in the workpiece by the drilling unit is greater than the core diameter of the thread. This results in various shortcomings such as poor engagement between the thread of the screw and the internal thread of the workpiece. The connection strength between the screw joined with the workpiece is reduced. Moreover, all of the drilling units in the above prior arts are formed on the cylindrical shank with the same diameter. Thus the drilling units only destroy the workpiece material lying adjacent to the shank surface during the process the screw being threaded into the workpiece and a hole is generated around the periphery of the shank. Once the shank is inserted into the workpiece by the thread, the workpiece material is compressed to have a higher density. The higher the density of the workpiece material, the higher the resistance of the screw being threaded into the workpiece and the larger the torsional force required for driving the screw into the workpiece. Moreover, both the drilling units and the threads are formed on the shank with the same diameter. Along with the increasing sectional area of the shank, the resistance that the drilling units encounter during cutting of the workpiece is getting greater. The operator needs to put in more effort to complete the job. The screw available now is unable to be threaded into the workpiece smoothly. Thus there is room for improvement and there is a need to provide a novel wood screw.

SUMMARY OF THE INVENTION

Therefore it is a primary object of the present invention to provide a wood screw that is not only driven into workpieces more smoothly but also allowing connection between itself and the workpiece more rigid.

In order to achieve the above object, a wood screw according to the present invention mainly includes a head and a shank connected to the head. The shank is formed by a main shank portion and a tapered portion whose diameter is smaller than that of the main shank portion. Both the main shank portion and the tapered portion are provided with a locking thread. A plurality of drilling units is disposed on the tapered portion while an outside diameter of the drilling unit is smaller than that of the locking thread of the tapered portion. Thereby the drilling units first destroy workpiece material on the outer part of the main shank portion in the relative position while the tapered portion being screwed into the workpiece so that the workpiece material becomes loose and the resistance of the locking thread of the main shank portion being screwed into the workpiece is reduced. Thus the wood screw is screwed into the workpiece more smoothly and effortlessly. Moreover, an internal thread segment whose thread depth matches that of the locking thread of the main shank portion is formed in the workpiece by the drilling units so that the wood screw and the workpiece are fastened and connected more rigidly.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
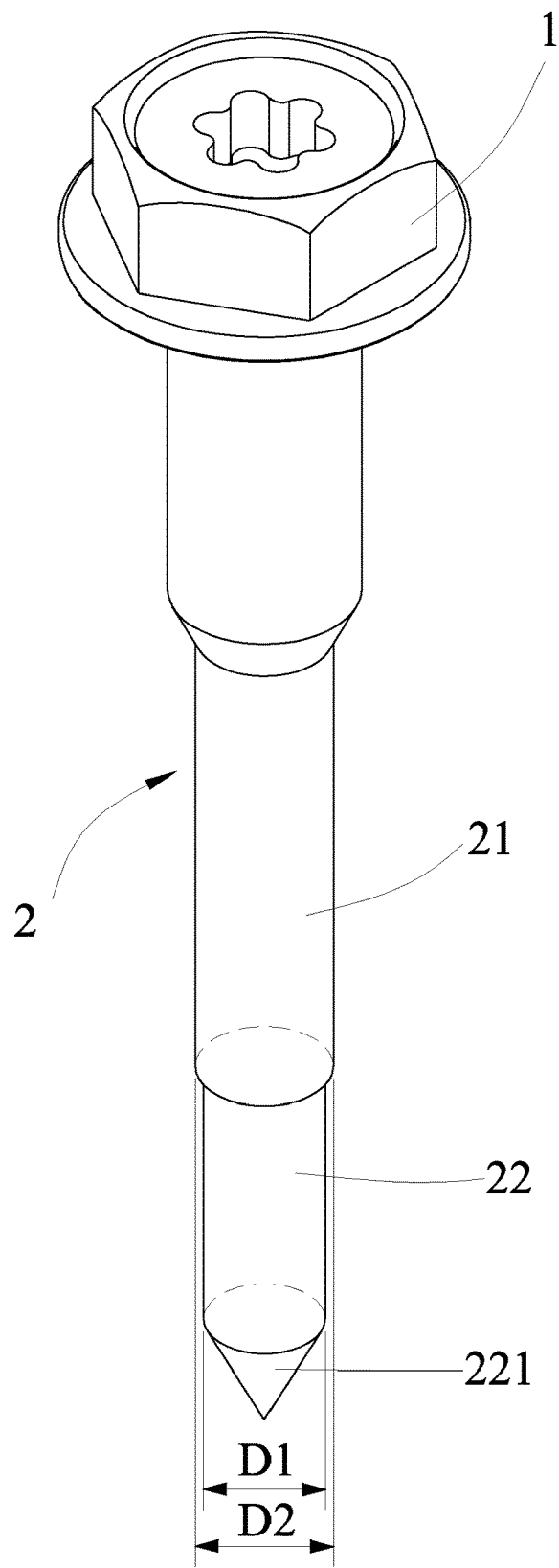
FIG. 1 is a perspective view schematically illustrating different portions of a shank connected to a head in a screw formed according to an embodiment of the present invention, with certain features removed for clarity of illustration.
Figure 2:
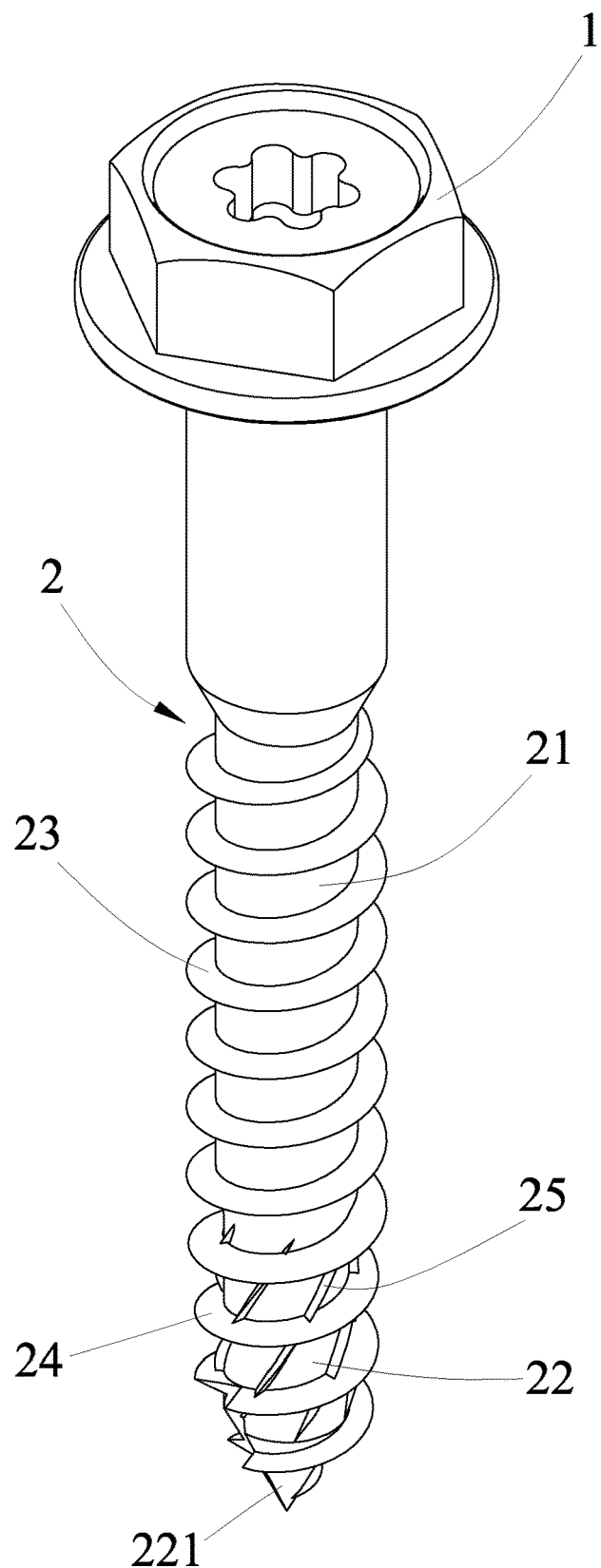
FIG. 2 is a perspective view of a screw formed according to an embodiment of the present invention.
Figure 3:
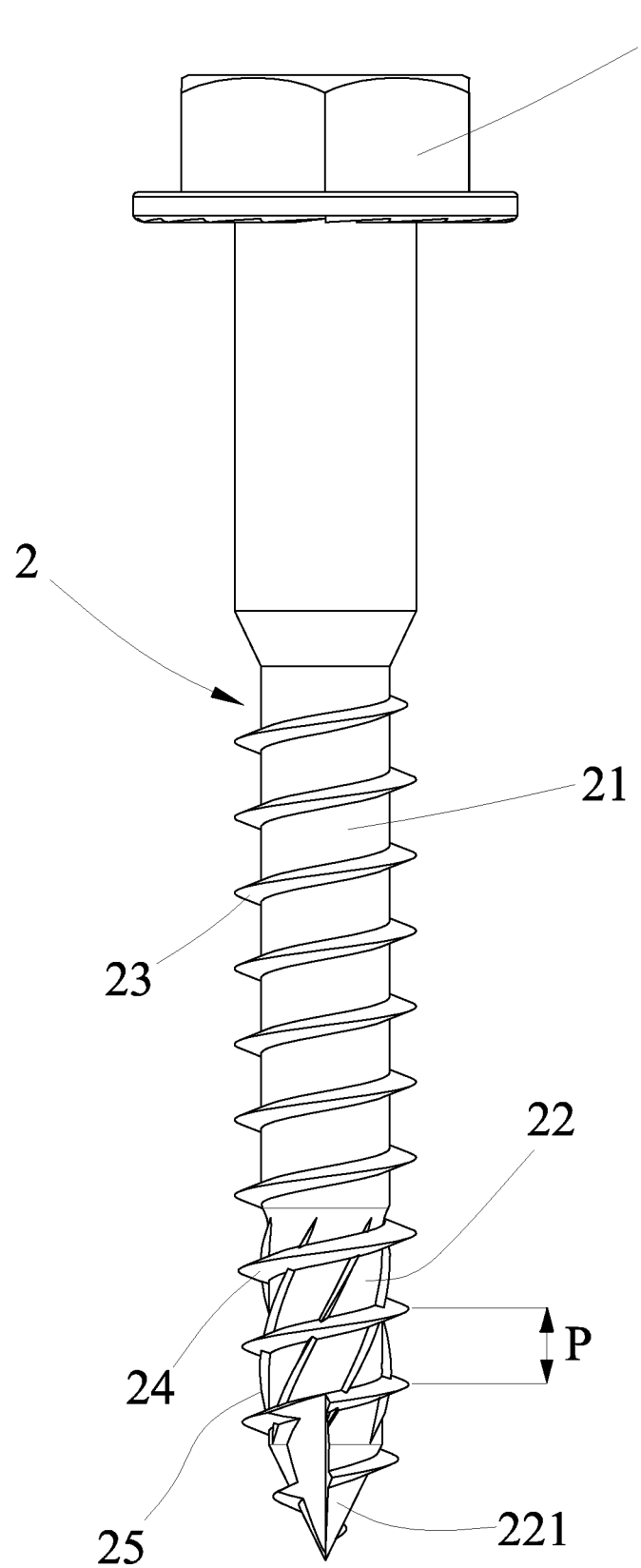
FIG. 3 is a front elevational view of a screw formed according to an embodiment of the present invention.
Figure 4:
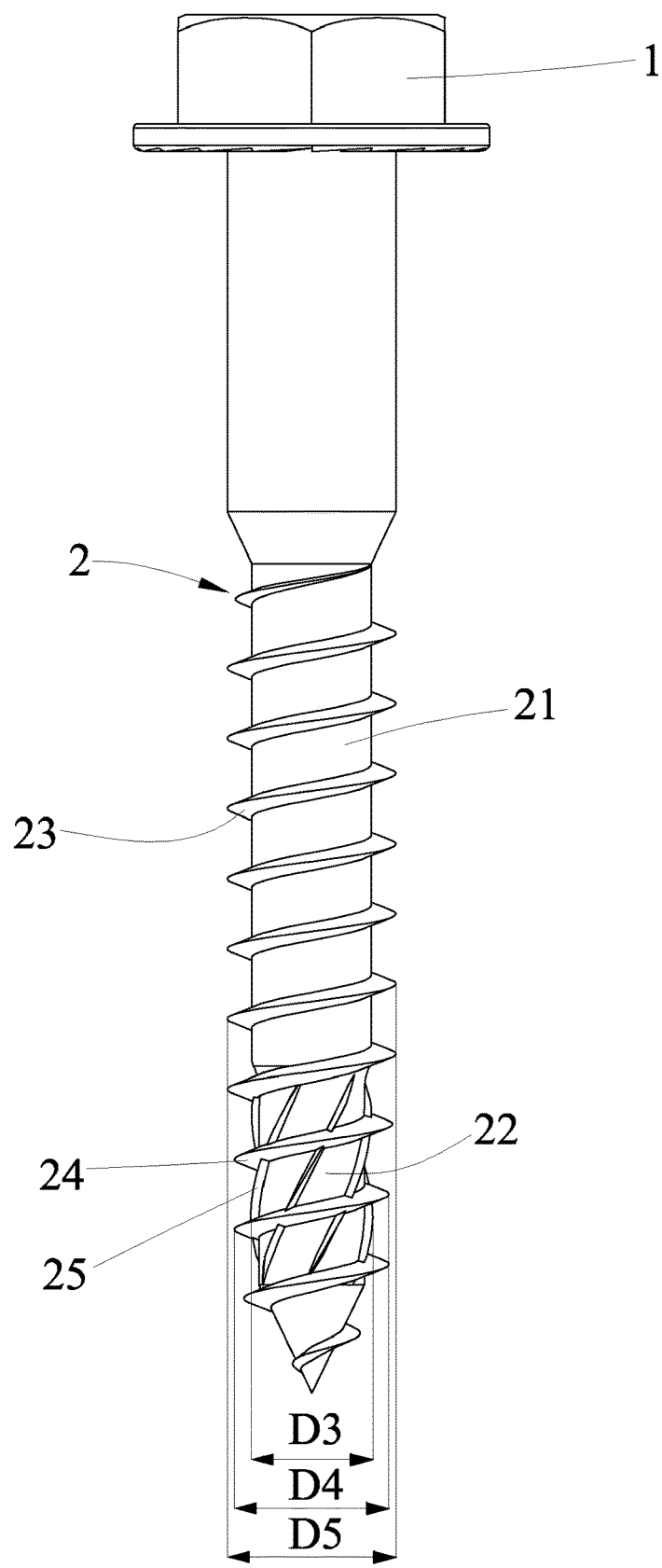
FIG. 4 is a rear elevational view of a screw formed according to an embodiment of the present invention.
Figure 5:
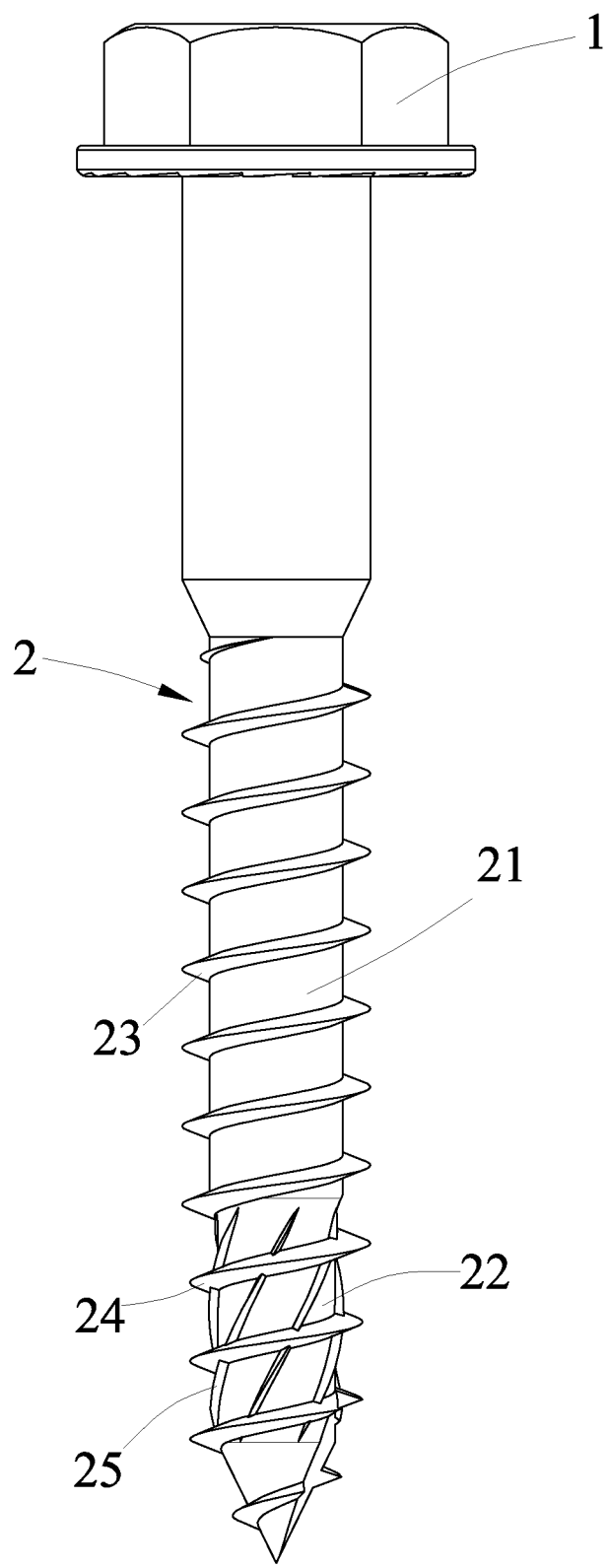
FIG. 5 is a left elevational view of a screw formed according to an embodiment of the present invention.
Figure 6:
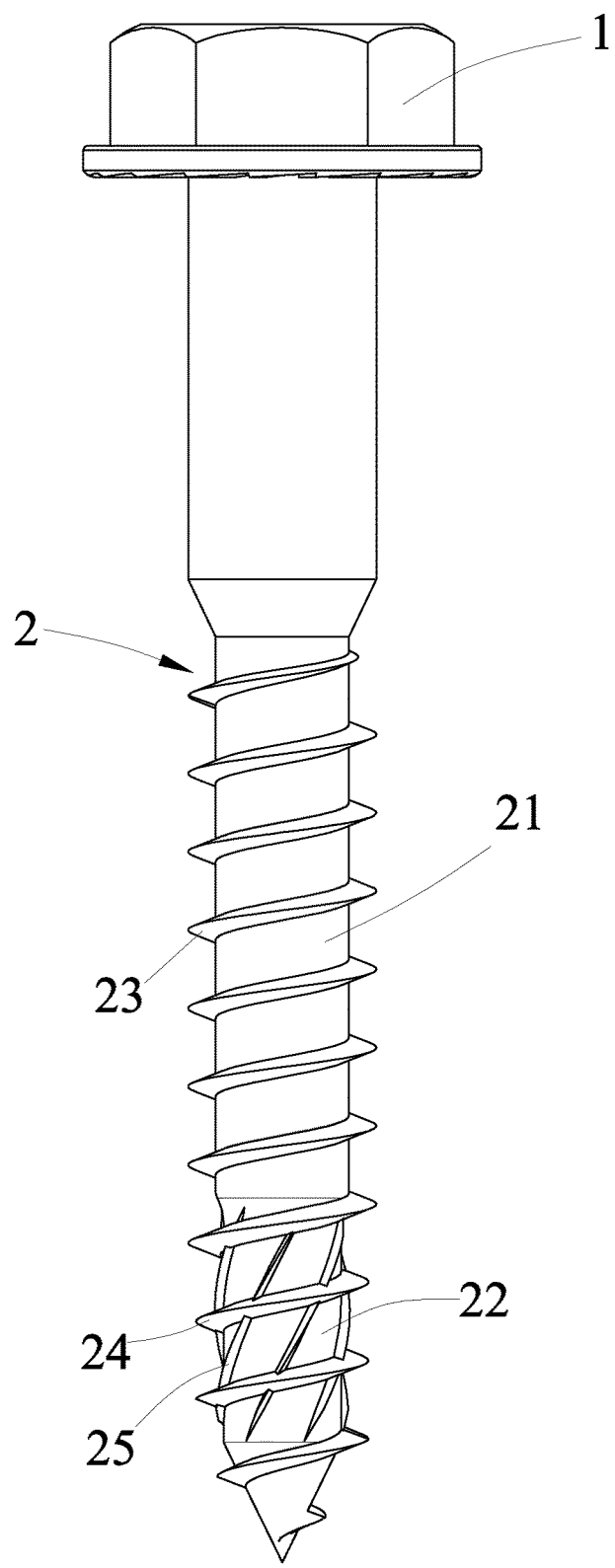
FIG. 6 is a right elevational view of a screw formed according to an embodiment of the present invention.
Figure 7:
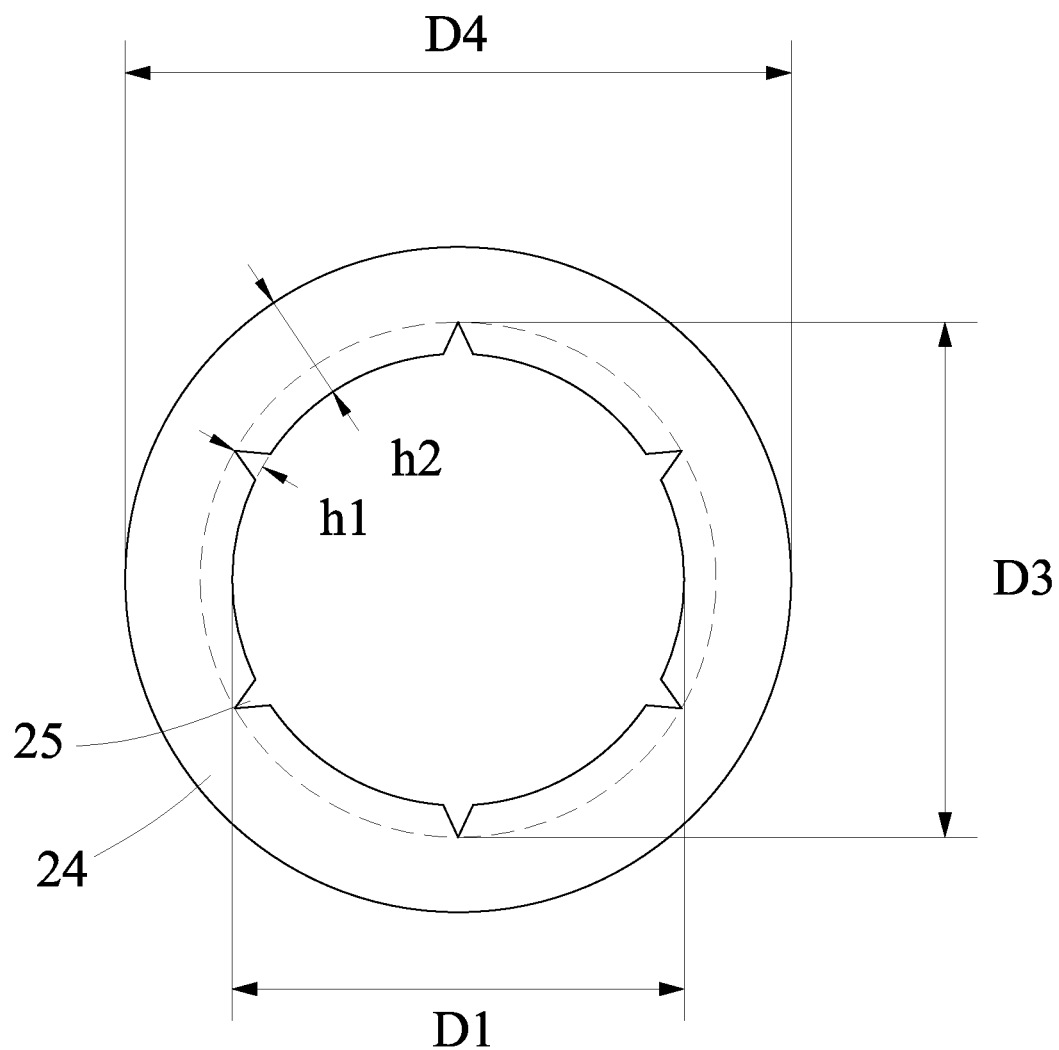
FIG. 7 is a top plan view of a screw formed according to an embodiment of the present invention.

Refer to FIG. 1, a wood screw according to the present invention mainly includes a head 1 and a shank 2 integrally connected to the head 1. The shank 2 consists of a main shank portion 21 and a tapered portion 22. Both the main shank portion 21 and the tapered portion 22 have a first end and a second end opposite to each other. The first end of the main shank portion 21 is facing the head 1 and the second end of the main shank portion 21 is connected to the first end of the tapered portion 22 while a conical end 221 is formed on the second end of the tapered portion 22. The diameter of the tapered portion 22 (D1) is smaller than the diameter of the main shank portion 21 (D2). Also refer to FIG. 2 and FIG. 3, a first locking thread 23 is formed on the main shank portion 21 and extending from the second end to the first end of the main shank portion 21. A second locking thread 24 is formed on the tapered portion 22, extending from the second end to the first end of the tapered portion 22 and connected to the first locking thread 23. The diameter of the tapered portion 22 (D1) is the core diameter of the second locking thread 24 while the diameter of the main shank portion 21 (D2) forms the core diameter of the first locking thread 23. A plurality of drilling units 25 is disposed on the tapered portion 22, obliquely to the length direction of the tapered portion 22, and spaced apart from one another. Each of the drilling units 25 spans at least one thread pitch (P) of the second locking thread 24 so that the top end and the bottom end of the drilling unit 25 are located in two different thread pitches of the second locking thread 24, respectively. As shown in FIG. 4, FIG. 5 and FIG. 6, the outside diameter (D3) of the drilling unit 25 is smaller than the outside diameter (D4) of the second locking thread 24 while the outside diameter (D4) of the second locking thread 24 is smaller than the outside diameter (D5) of the first locking thread 23. Also refer to FIG. 7, the height of the drilling unit 25 (h1) is no more than 0.9 times of the height (h2) of the second locking thread 24 (h2).

Thereby the conical end 221 of the tapered portion 22 of the wood screw of the present invention is abutting against a workpiece while the wood screw is applied to workpieces such as wood, polywoods, etc. for screwing and fastening. Then the head 1 is driven by tools such as screwdrivers for rotating the tapered portion 22. Thus the conical end 221 is driven into the workpiece and the drilling units 25 on the tapered portion 22 destroy the workpiece material radially. Although the volume of the main shank portion 21 being driven into the workpiece by the first locking thread 23 remains unchanged, the workpiece material has become loose with reduced density owing to the workpiece material has been destroyed in advance on the outer part of the main shank portion 21 in the relative position by the drilling units 25 on the tapered portion 22. Thus the counterforce suppressing the first locking thread 23 on the main shank portion 21 during the screwing process can be reduced. The torque required to drive the present wood screw into the workpiece is further minimized. Therefore the present wood screw and the workpiece are threaded and fastened more smoothly.

Moreover, the depth of the internal thread of the workpiece is getting larger along with the second locking thread 24 of the tapered portion 22 and the first locking thread 23 of the main shank portion 21 being screwed into the hole formed by the drilling units 25 in turn because that the outside diameter (D3) of the drilling unit 25 is smaller than the outside diameter (D4) of the second locking thread 24 and the outside diameter (D4) of the second locking thread 24 is smaller than the outside diameter (D5) of the first locking thread 23. And an internal thread segment whose thread depth matches the thread depth of the first locking thread 23 of the main shank portion 21 for engagement is formed in the workpiece. Thereby the present wood screw and the workpiece are fastened and connected more firmly.

Figure 8:
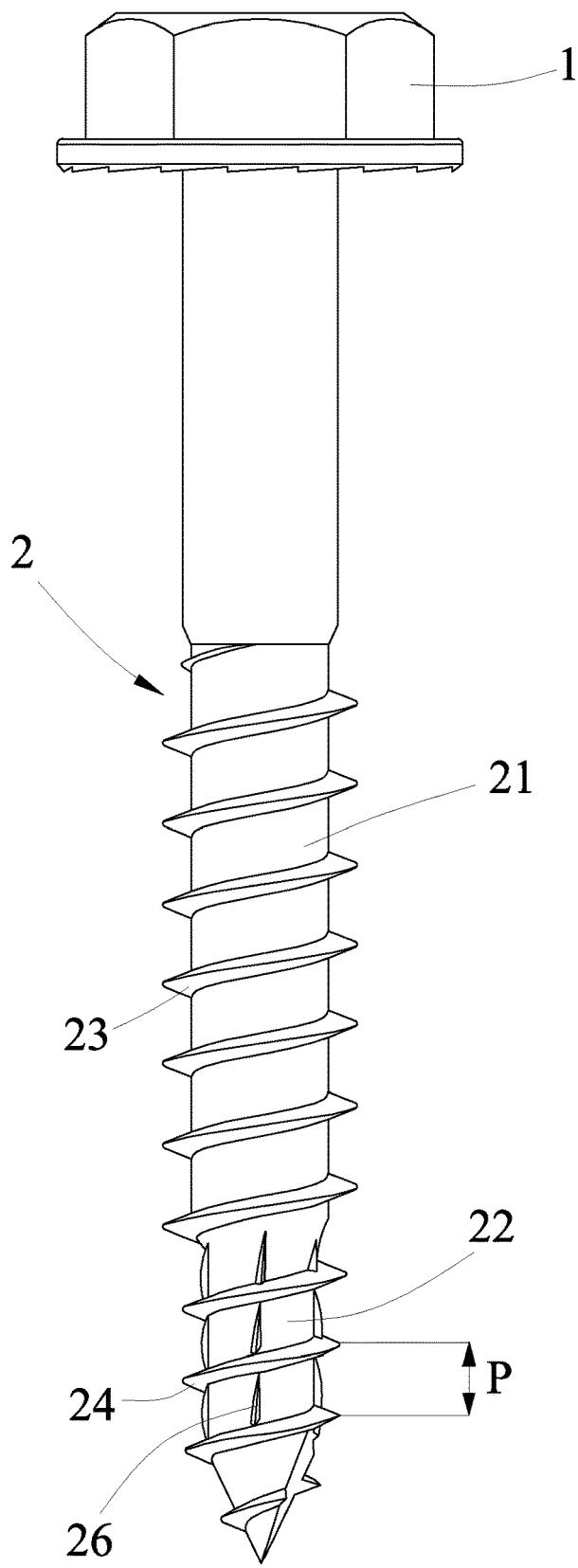
FIG. 8 is a front elevational view of a screw formed according to an alternate embodiment of the present invention.
Figure 9:
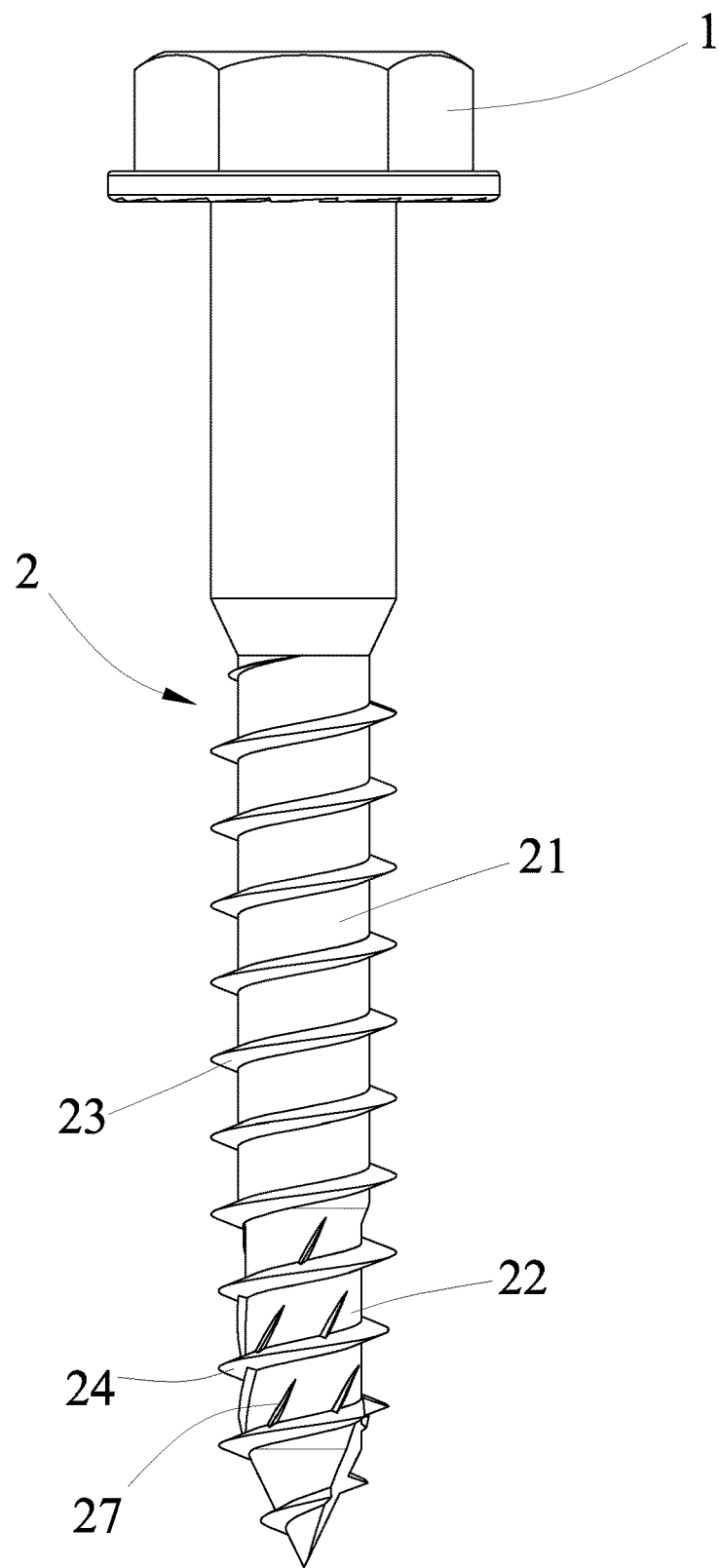
FIG. 9 is a front elevational view of a screw formed according to a further alternate embodiment of the present invention.
Figure 10:
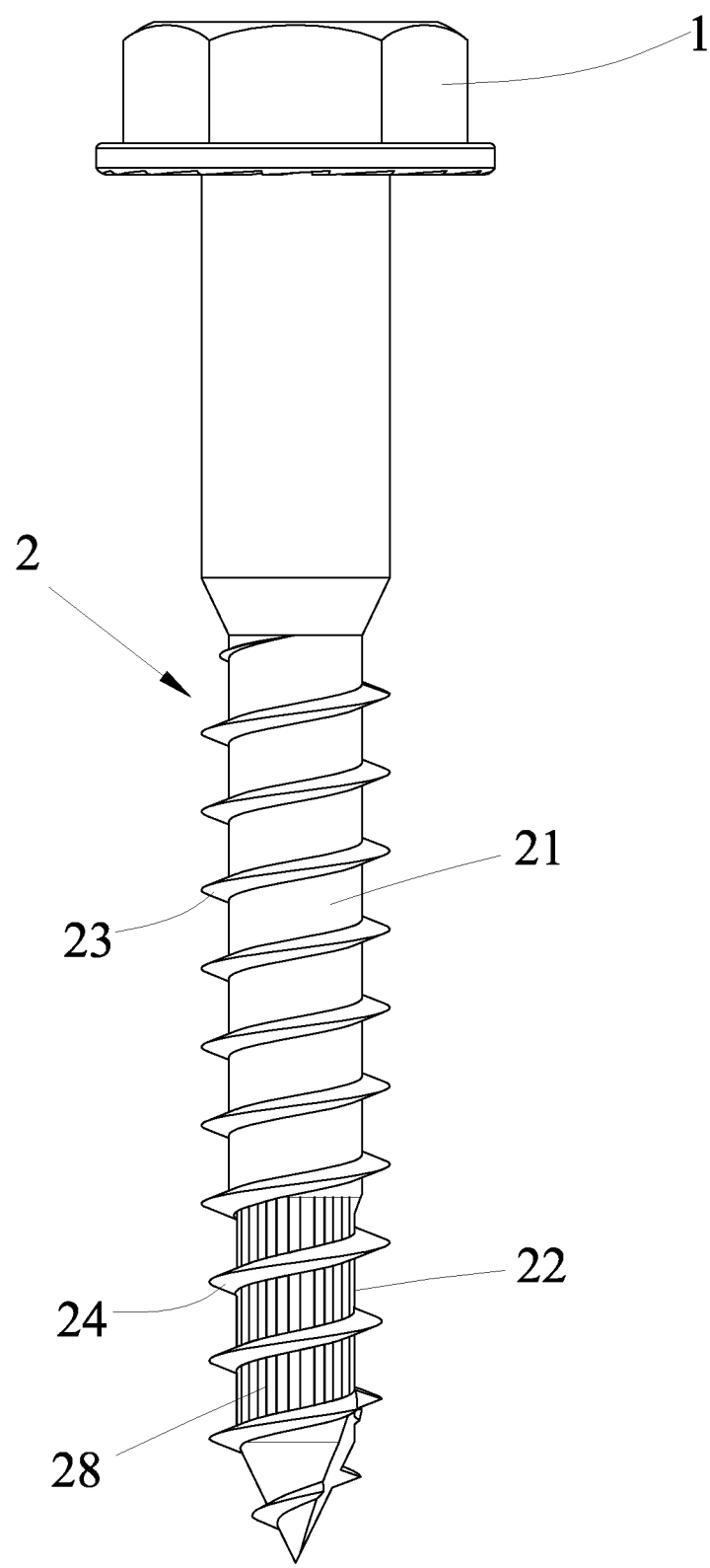
FIG. 10 is a front elevational view of a screw formed according to yet another alternate embodiment of the present invention.

Furthermore, refer to another embodiment shown in FIG. 8, a plurality of drilling units 26 is disposed on the tapered portion 22 linearly along the length direction of the tapered portion 22 and spaced from one another. Each of the drilling units 26 doesn't span one thread pitch (P) of the second locking thread 24 so that the top end and the bottom end of the drilling unit 26 are located in the same thread pitch of the second locking thread 24. Also refer to FIG. 9, in a further embodiment, a plurality of drilling units 27 is arranged obliquely to the length direction of the tapered portion 22 and spaced from one another. The respective drilling unit 27 doesn't extend across one thread pitch of the second locking thread 24 so that the top end and the bottom end of the drilling unit 27 are located in the same thread pitch of the second locking thread 24. Refer to FIG. 10, a further embodiment is revealed. A plurality of drilling units 28 is formed on the tapered portion 22 linearly along the length direction of the tapered portion 22 and spaced from one another. The drilling unit 28 extends across at least one thread pitch of the second locking thread 24 so that the top end and the bottom end of the drilling unit 28 are located in two different thread pitches of the second locking thread 24, respectively. The above drilling units 26, 27, 28 can also destroy the workpiece material in advance for reducing the torque required to drive the first locking thread 23 of the main shank portion 21 into the workpiece. Thus the wood screw and the workpiece are fastened with each other more smoothly.

In summary, the present invention has the following advantages according to the above embodiments:

1. The diameter of the tapered portion is smaller than that of the main shank portion. Thus the drilling units first destroy workpiece material on the outer part of the main shank portion in the relative position when the tapered portion is driven into the workpiece. Thus the workpiece material becomes loose and the resistance of the first locking thread of the main shank portion being screwed into the workpiece is reduced. Therefore the wood screw is fastened to the workpiece more smoothly and easily.

2. Owing to the outside diameter of the drilling unit smaller than the outside diameter of the second locking thread and the outside diameter of the second locking thread smaller than the outside diameter of the first locking thread, an internal thread segment whose thread depth matches the thread depth of the first locking thread of the main shank portion for engagement is formed in the workpiece along with the second locking thread and the first locking thread being screwed into the hole formed by the drilling units in turn. Thereby the wood screw and the workpiece are fastened and connected more rigidly.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A wood screw comprising:
   a head; and
   a shank integrally connected to the head and extending along a length direction, the shank including a main shank portion and a tapered portion; wherein:
   the main shank portion and the tapered portion have a first end and a second end opposite each other;
   the first end of the main shank portion is directed to the head and the second end of the main shank portion is connected to the first end of the tapered portion, and a conical end is formed on the second end of the tapered portion;
   the tapered portion remains smaller in diameter than the main shank portion about the length direction of the shank; and,
   a first locking thread is formed on the main shank portion extending from the second end to the first end of the main shank portion and a second locking thread is formed on the tapered portion extending from the second end to the first end of the tapered portion to connect to the first locking thread, said second locking thread being continuously joined to said first locking thread throughout an interface of said main shank portion and said tapered portion;
   wherein a plurality of drilling units is formed on the tapered portion, the drilling units are smaller in outside diameter than the second locking thread, and the second locking thread is smaller in outside diameter than the first locking thread, said second locking thread having a constant outer diameter throughout the length of said tapered portion.

2. The wood screw as claimed in claim 1, wherein both the drilling unit and the second locking thread have a height; the height of the drilling unit is no more than 0.9 times of the height of the second locking thread.

3. The wood screw as claimed in claim 1, wherein the drilling units are arranged at the tapered portion along the length direction of the shank linearly or obliquely, and spaced from one another.

4. The wood screw as claimed in claim 1, wherein each of the drilling units spans at least one thread pitch of the second locking thread so that the top end and the bottom end of the drilling unit are located in two different thread pitches of the second locking thread, respectively.

5. The wood screw as claimed in claim 1, wherein at least one of the drilling units extends across a portion of one thread pitch of the second locking thread, the top end and the bottom end of each drilling unit being thereby located within the same thread pitch of the second locking thread.

6. The wood screw as claimed in claim 1, wherein no thread pitch of the second locking thread is fully spanned by an individual drilling unit along the length direction of the shank.

* * * * *